(12) United States Patent
Noritake

(10) Patent No.: US 6,244,564 B1
(45) Date of Patent: Jun. 12, 2001

(54) MOTOR-TYPE DAMPER UNIT

(75) Inventor: Seiichiro Noritake, Nagano (JP)

(73) Assignee: Kabushuki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/501,627

(22) Filed: Feb. 10, 2000

(51) Int. Cl.[7] .................................................. F16K 31/02
(52) U.S. Cl. .............................. 251/129.11; 251/250.5; 74/435
(58) Field of Search .......................... 251/124.11, 250.5; 74/435

(56) References Cited

U.S. PATENT DOCUMENTS

| | | | |
|---|---|---|---|
| 4,065,980 | * | 1/1978 | Ichinose ............................. 74/435 X |
| 4,117,739 | * | 10/1978 | Meier et al. ........................ 74/435 X |
| 4,144,774 | * | 3/1979 | Berlinger, Jr. ........................ 74/435 |
| 4,595,081 | * | 6/1986 | Parsons ........................ 251/129.11 X |
| 5,018,364 | * | 5/1991 | Chesnut et al. ............. 251/129.11 X |
| 5,174,546 | * | 12/1992 | Giordani ..................... 251/129.11 X |
| 5,310,021 | * | 5/1994 | Hightower ......................... 251/77 X |
| 5,605,072 | * | 2/1997 | Schmidt et al. ........................ 74/435 |
| 5,727,653 | * | 3/1998 | Grossenbacher et al. .. 251/129.11 X |
| 5,876,014 | | 3/1999 | Noritake et al. . |
| 6,082,206 | * | 7/2000 | Terada ............................. 74/435 X |

FOREIGN PATENT DOCUMENTS

| | | | |
|---|---|---|---|
| 6-109354 | 4/1994 | (JP) | ................. F25D/17/08 |
| 10-306970 | 11/1998 | (JP) | ................. F25D/17/08 |

* cited by examiner

Primary Examiner—Kevin Shaver
Assistant Examiner—John Bastianelli
(74) Attorney, Agent, or Firm—Sughrue, Mion, Zinn, Macpeak & Seas, PLLC

(57) ABSTRACT

A motor-type damper unit includes a motor for driving in a single direction, an opened/closed member for reciprocating in an opening direction and a closing direction with a fulcrum shaft serving as a center by a drive force of said motor, an intermittent drive gear formed with a tooth part in a predetermined part in a circumferential direction and rotation blocking parts at both ends of the tooth part, said intermittent drive gear for rotating by the drive force of said motor, a first transmission gear placed on the fulcrum shaft for engaging the tooth part of said intermittent drive gear, thereby rotating said opened/closed member in a predetermined direction and a second transmission gear for engaging the tooth part of said intermittent drive gear at a different position from said first transmission gear, for transmitting a rotation force of said intermittent drive gear to said first transmission gear and for rotating said first transmission gear in an opposite direction to the predetermined direction.

4 Claims, 19 Drawing Sheets

Full open stop position 0° (360°)

Close operation starting position 30°

Close operation ending position 115°

Full close stop position 180°

Full open stopping position 245°

Close operation ending position 330°

PRIOR ART

PRIOR ART

MOTOR-TYPE DAMPER UNIT

BACKGROUND OF INVENTION

Field of invention

This invention relates to a motor-type damper unit using a motor for opening/closing an opened/closed member such as a baffle with respect to an opening portion.

Hitherto, for example, a motor unit having a motor such as an AC synchronous motor or a stepping motor as a drive source as shown in FIG. 17 has been known as a motor-type damper unit. (Refer to JP-A-6-109354.)

In FIG. 17, a motor-type damper unit 100 comprises a baffle 102 and a drive mechanism section 103 such as an AC synchronous motor placed with a rotation fulcrum shaft 101 between.

The motor-type damper unit 100 in the related art converts the rotation torque of the synchronous motor into the thrust direction torque of a spindle. The thrust direction torque of the spindle causes the baffle 102 to rotate on the rotation fulcrum shaft 101. Thus, the rotation direction torque is converted into the thrust direction torque for opening/closing the baffle 102.

The described motor-type damper unit 100 is used with a refrigerator 110 for controlling taking cold air into the refrigerator in a manner as shown in FIG. 18. That is, the refrigerator 110 is separated into a freezer 111, a cold room 112, and a vegetable room 113, the freezer 111 being provided with an evaporator 114 on the bottom. A fan motor 115 is disposed in the rear of the evaporator 114 for sending and circulating provided cold air to and through the freezer 111 and the cold room 112. A compressor 119 for liquefying a cooling medium is placed in a lower part of the refrigerator 110.

A partition plate 116 is placed between the evaporator 114 and the freezer 112 for shutting off a direct flow of cold air provided by the evaporator 114 into the cold room 112. On the other hand, a cold air circulation passage 117 is formed between the rear of the partition plate 116 and the rear inner wall of the refrigerator 110, and the motor-type damper unit 100 is disposed in the cold air circulation passage 117. When the baffle 102 of the motor-type damper unit 100 is opened, the cold air circulation passage 117 for allowing cold air to flow enters a crank state. The motor-type damper unit 100 is installed in such a manner that it is held on a partition wall 118 forming a part of the cold air circulation passage 117.

The motor-type damper unit 100 in the related art is of the type wherein it is orthogonal to the cold air circulation passage 117 as described above, and only the damper unit for bending the cold air flow at right angles can be used. Moreover, since the cold air circulation passage 117 becomes like a crank, a protuberance width of the partition wall 118 to the inside of the refrigerator 110, M, grows as shown in FIG. 18, causing the volume of the refrigerator 110 to be decreased.

Further, the baffle 102 is not opened to a position at which it becomes parallel to the cold air flow, and is opened only to a slanting position as shown in FIG. 18, thus the baffle 102 becomes resistant to the cold air flow; it is not preferred for rapid diffusion of the cold air. For the motor-type damper unit 100 itself, a width of the drive mechanism section 103, N, grows; the portion of the drive mechanism section 103 becomes a large dead space.

It is therefore an object of the invention to provide a motor-type damper unit using a one-way drive motor capable of rotating an opened/closed member such as a baffle in an open/closing direction.

DETAILED DESCRIPTION OF PREFERRED EMBODIMENTS

Figure 1:
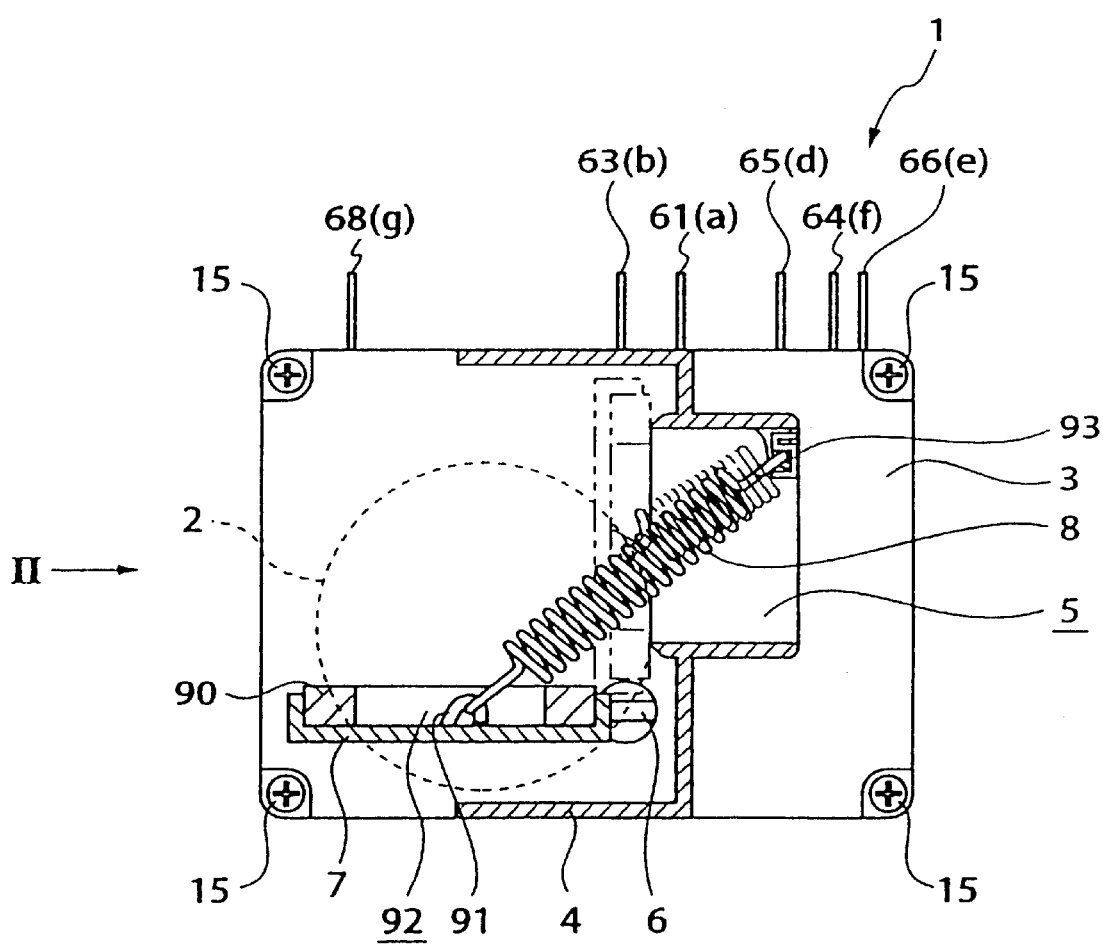
FIG. 1 is a sectional view of an embodiment of a motor-type damper unit of the invention.
Figure 2:
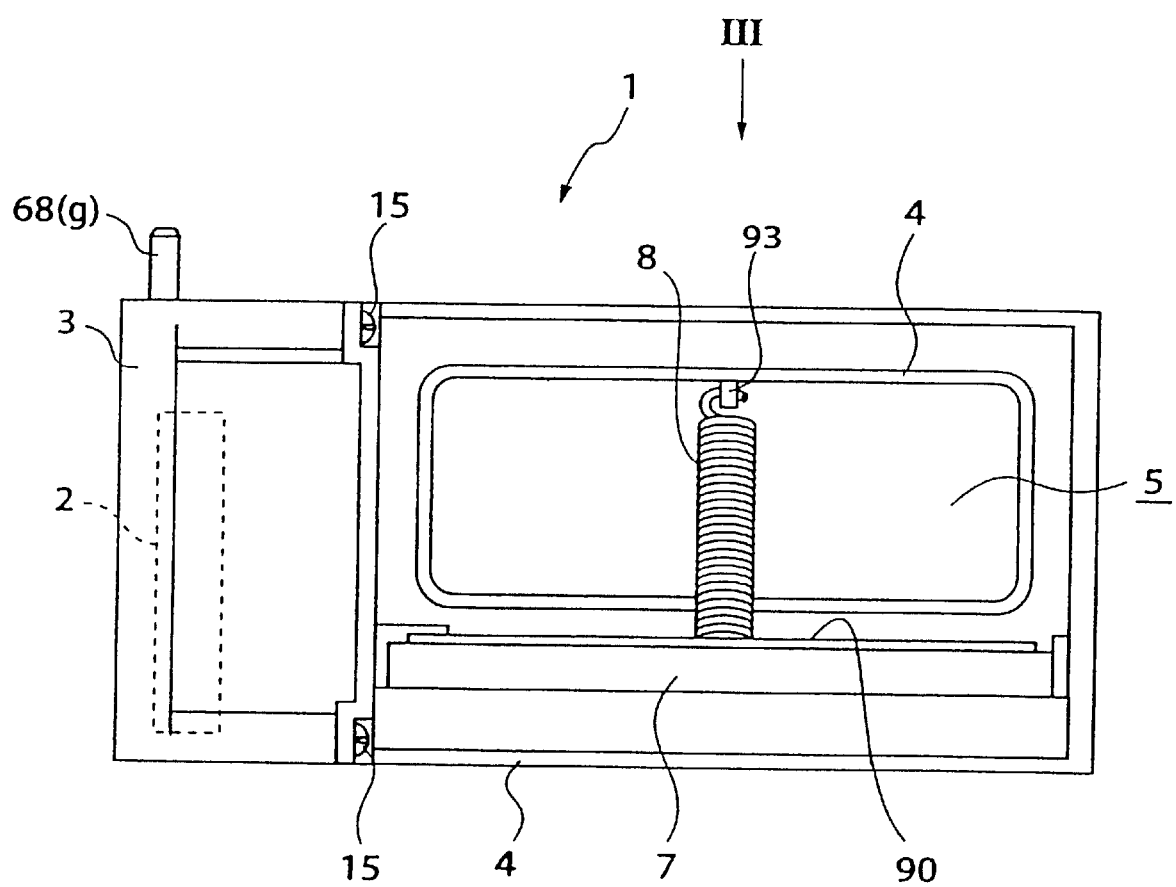
FIG. 2 is a front view from the direction of arrow II in FIG. 1.
Figure 3:
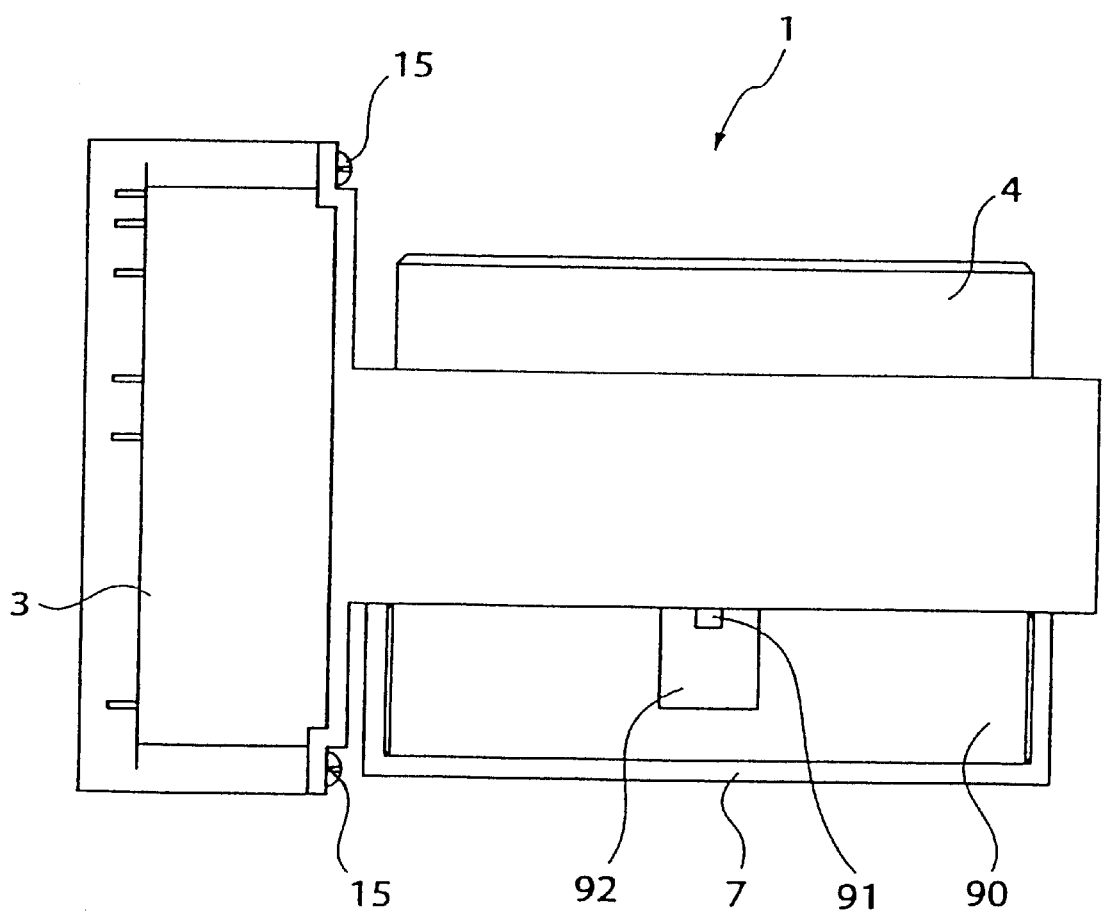
FIG. 3 is a plan view from the direction of arrow III in FIG. 2.

Referring now to the accompanying drawings (FIGS. 1 to 15), there is shown a preferred embodiment of a motor-type damper unit of the invention. The motor-type damper unit shown in the embodiment of the invention is a type of motor unit used with a refrigerator.

A motor-type damper unit 1 consists mainly of a drive section 3 having a motor, a tubular frame 4 opened at both ends, an opening portion 5 made in the frame 4, and a baffle 7 as an opened/closed member opened and closed with a fulcrum shaft 6 as the center with respect to the opening portion 5. A coil spring 8 for urging the baffle 7 in the closing direction is placed between the frame 4 and the baffle 7.

Figure 4:
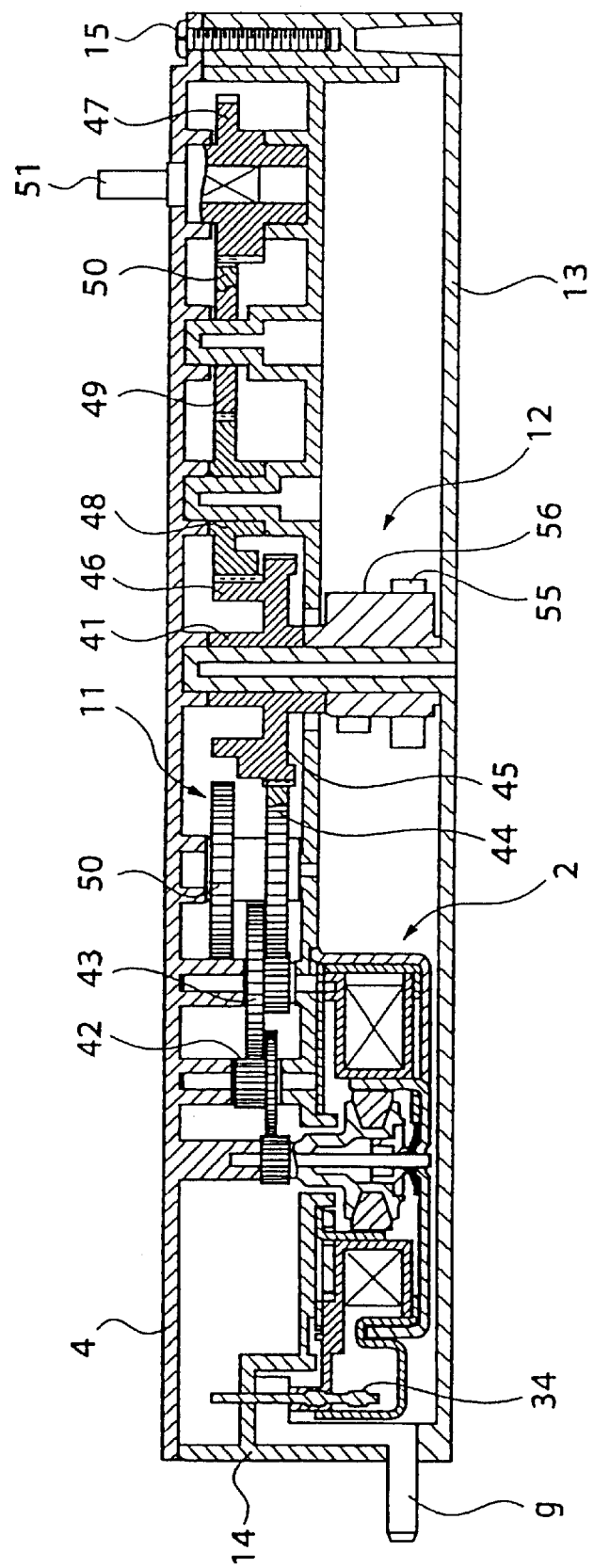
FIG. 4 is an expansion plan of the side inside of a drive section of the motor-type damper unit in FIG. 1.

As shown in an expansion plan of FIG. 4, the drive section 3 comprises an AC small synchronous motor 2 for driving the baffle in one direction, a gear train part 11, and a cam part 12, surrounded by a drive section case 13, a drive section lid 14, and the frame 4. They are fixed in one piece by screws 15.

The small AC synchronous motor 2 consists mainly of a motor case 21 also serving as one core, a motor core 22, a bobbin 23 sandwiched therebetween, magnet wire 24 formed like a cylinder in the bobbin 23, a rotor 25 placed at the center, and upper and lower shading plates 26 and 27 for allowing the rotor 25 to rotate in a constant direction.

Figure 5:
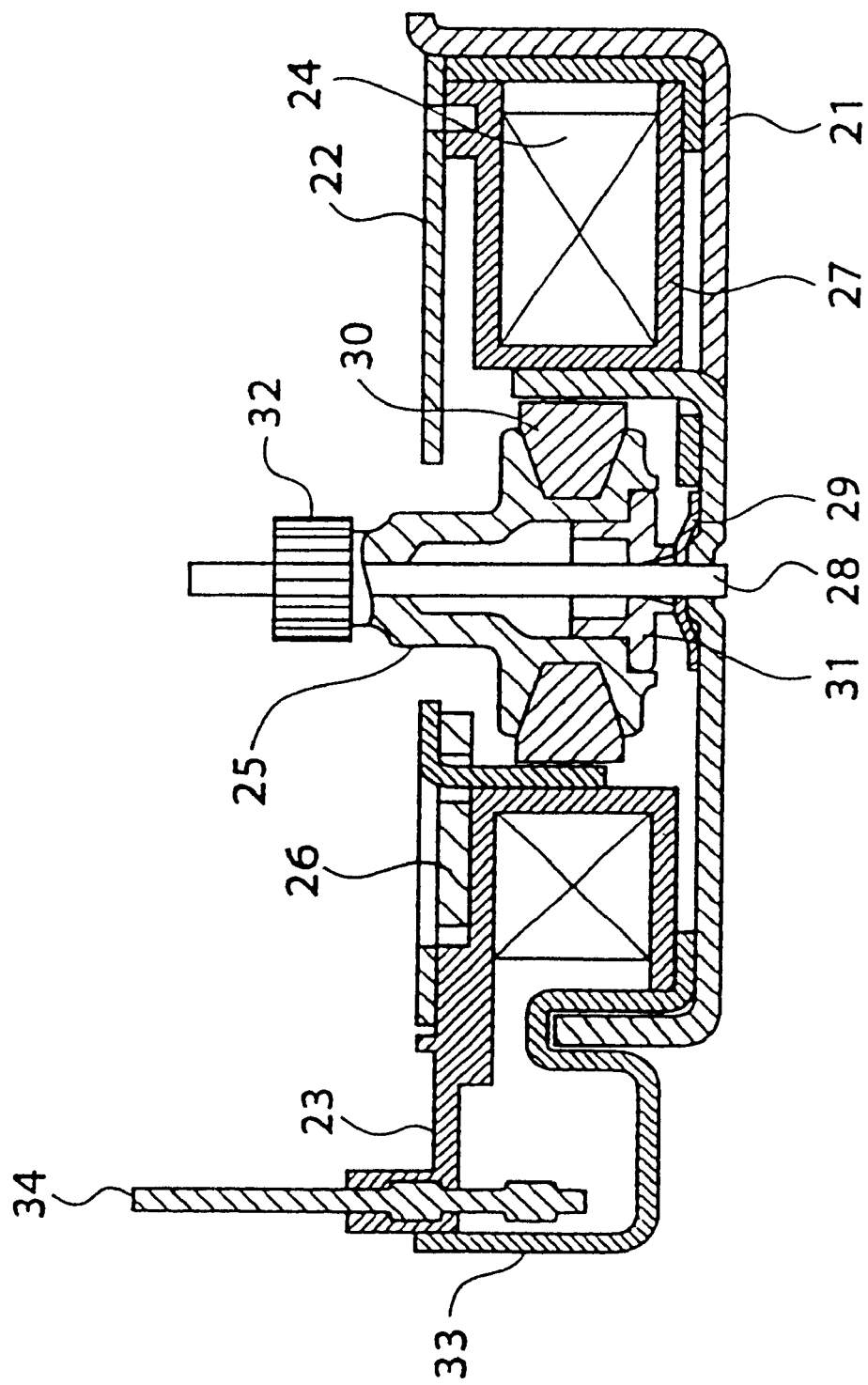
FIG. 5 is a sectional side view of a small AC synchronous motor used with the motor-type damper unit in FIG. 1.
Figure 6:
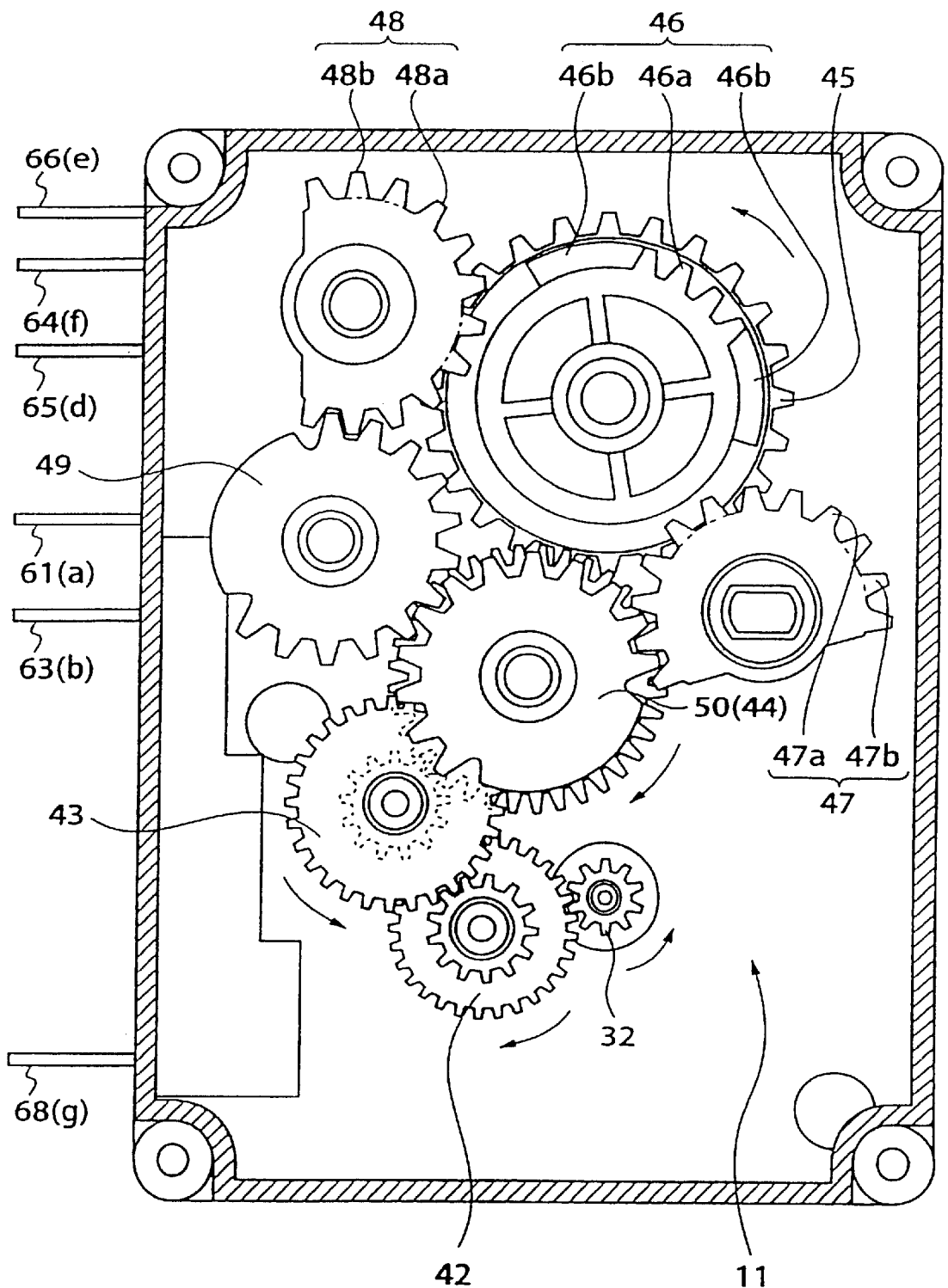
FIG. 6 is a plan view to show a gear train part of the drive section of the motor-type damper unit in FIG. 1.
Figure 7:
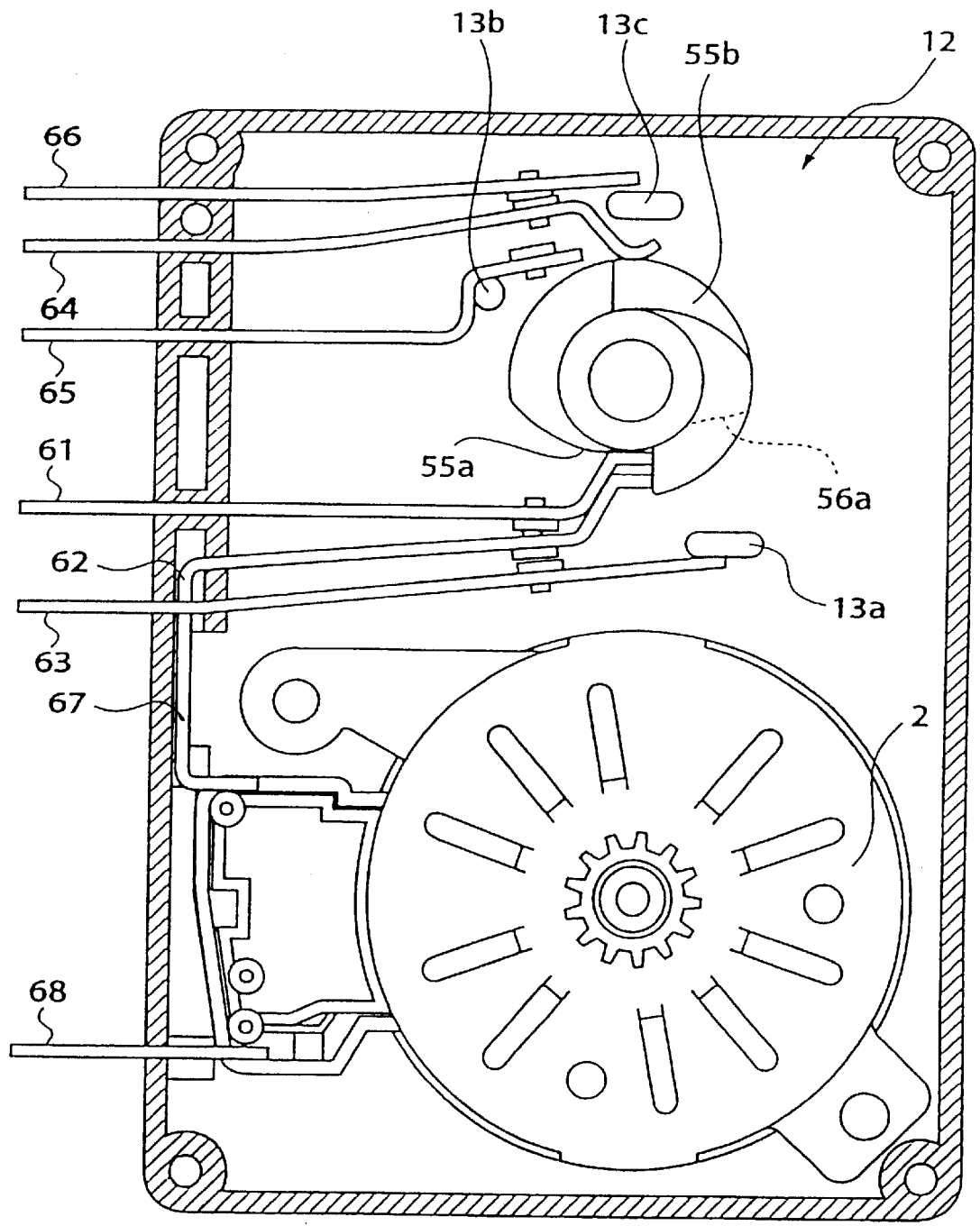
FIG. 7 is a plan view to show a cam part and the small AC synchronous motor of the drive section of the motor-type damper unit in FIG. 1.

The rotor 25 is supported on a shaft 28 fixed to the motor case 21 for rotation and is urged by a spring 29 upward in FIG. 5. The rotor 25 has a magnet 30, a bearing 31, a pinion 32. The bobbin 23 is covered with a bobbin cover 33 and the magnet wire 24 is connected at one end to a pin 34, which is connected to a terminal g described later.

The gear train 11 is made up of two ring trains. The first gear train is provided for transmitting continuous rotation of the AC small synchronous motor 2 in one direction. The second gear train is a gear train for receiving rotation from the first gear train and operating the baffle 7 in the closing direction and the opening direction.

Specifically, in the embodiment, the first gear train consists of a first gear 42 meshing with the pinion 32 of the rotor 25, a second gear 43 meshing with a pinion part of the first gear 42, a third gear 44 meshing with a pinion part of the second gear 43, and a drive gear 41 as a fourth gear. A gear part 45 of the drive gear 41 is formed on a full circumference with teeth.

The second gear train is made up of two chains. The first chain is a chain for transmitting rotation from an intermittent drive gear 46 provided integrally with the drive gear 41 coaxially to a first transmission gear 47 as an eighth gear with no intervention. The intermittent drive gear 46 consists of a tooth part 46a and rotation blocking parts 46b. In the embodiment, the tooth part 46a and the rotation blocking parts 46b and 46b are formed on an outer periphery over about 130 degrees; the tooth part 46a consisting of four teeth is formed over about 75 degrees at the center and the rotation blocking parts 46b and 46b are formed on both sides of the remainder of 130 degrees for blocking rotation of the first transmission gear 47. The rotation blocking part 46b is shaped like a step in the axial direction; in the embodiment, it is formed about a half the thickness of the tooth part 46a. The rotation blocking part 46b can axially overlap a second tooth part 47b, 48b formed about a half the thickness of the first transmission gear 47, a second transmission gear 48 described later.

The second chain of the second gear train is a gear train from the intermittent drive gear 46 to the second transmission gear 48 as a fifth gear to a sixth gear 49 and a seventh gear 50 as an intermediate gear train to the first transmission gear 47. The first transmission gear 47 and the second transmission gear 48 are both formed with teeth over about 230 degrees and have first tooth parts 47a and 48a each having a thickness of the full length in the axial direction and second tooth parts 47b and 48b each having about a half the thickness in the axial direction.

In the embodiment, the sixth gear 49 and the seventh gear 50 as the intermediate gear train are intermittent gears both formed with teeth over about 270 degrees. Further, the seventh gear 50 is placed axially overlapping the third gear 44.

A fulcrum shaft substrate 51 forming a part of the fulcrum shaft 6 engages the first transmission gear 47. The fulcrum shaft substrate 51 engages the fulcrum shaft 6 of the baffle 7 for rotating the baffle 7 on the fulcrum shaft 6 in the open/closing direction.

Here, the second chain of the second gear train uses rotation of the intermittent drive gear 46 always rotating in one direction to transmit rotation of the intermittent drive gear 46 to the first transmission gear 47 via the second transmission gear 48, the sixth gear 49, and the seventh gear 50 belonging to the second chain, thereby rotating the baffle 7 from the closed position to the open position (because of assuming that the baffle 7 is rotated from the open position to the closed position, for example, by operating the first chain).

Therefore, the rotation angle of the second transmission gear by means of the tooth part is designed to almost match the rotation angle of the first transmission gear by means of the tooth part. Likewise, the sixth gear 49 and the seventh gear 50 as the intermediate gear train may function so as not to change with the rotation angles of the first transmission gear 47 and the second transmission gear 48; in the embodiment, they have the same diameters as the first and second transmission gears 47 and 48 for simplifying the structure.

Further, the rotation direction becomes a condition for the first transmission gear 47 provided with the fulcrum shaft 6 to rotating the baffle 7 in the open/closing direction using the drive gear 41 always rotating in one direction, thus the number of gears of the intermediate gear train is a multiple of two including 0, such as 0, 2, 4, 6, . . . .

Although not shown, the first transmission gear 47, the second transmission gear 48, the sixth gear 49, and the seventh gear 50 are formed with marks so as to indicate the initialization positions for smooth assembly.

The cam part 12 comprises a damper cam 55 for switching and driving the small AC synchronous motor 2 with a temperature sensor described later and a fan motor cam 56 for driving a fan motor 76, the damper cam 55 and the fan motor cam 56 being axially stacked and integrally formed. The drive gear 41 is axially stacked above the cam part 12 in FIG. 4. The drive gear 41 is formed at an end part with a vertical part gradually projecting over 180 degrees and returning to the origin in the final part. On the other hand, the cam part 12 is formed at an end part with a vertical part gradually recessed over 180 degrees and returning to the origin in the final part. Both the vertical parts abut each other, whereby one-way rotation of the drive gear 41 is transmitted to the cam part 12.

Corresponding to the damper cam 55, a first contact piece 61 dropped into two step parts 55*a* and 55*b*, a second contact piece 62 dropped only into one step part 55*a*, and a third contact piece 63 brought into or out of contact with the second contact piece 62 are provided. Here, the first contact piece 61 corresponds to a contact piece a described later and the third contact piece 63 corresponds to a contact piece b described later. The second contact piece 62 is formed integrally with a first terminal 67 described later and is connected to an opposite end of the magnet wire 24 of the small AC synchronous motor 2. The drive section case 13 is provided with a first move blocking part 13*a* for reliably bringing the third contact piece 63 out of contact with the second contact piece 62 when the second contact piece 62 is dropped into the step part 55*a*.

Corresponding to the fan cam motor 56, a fourth contact piece 64 dropped into a wide step part 56*a* on the outer periphery of the fan cam motor 56, a fifth contact piece 65 that the fourth contact piece 64 abuts when it is dropped, and a sixth contact piece 66 that the fourth contact piece 64 abuts when it is not dropped into the step part 56*a* are provided. Here, the fourth 13 contact piece 64 corresponds to a contact piece f described later. The drive section case 13 is provided with a second move blocking part 13*b* for holding the position of the fifth contact piece 65 and a third move blocking part 13*c* for reliably bringing the sixth contact piece 66 out of contact with the fourth contact piece 64.

The magnet wire 24 of the small AC synchronous motor 2 is connected at one end to the first terminal 67 and at an opposite end to a second terminal 68. Here, the first terminal 67 corresponds to a terminal c described later and the second terminal 68 corresponds to the terminal g.

Figure 8:
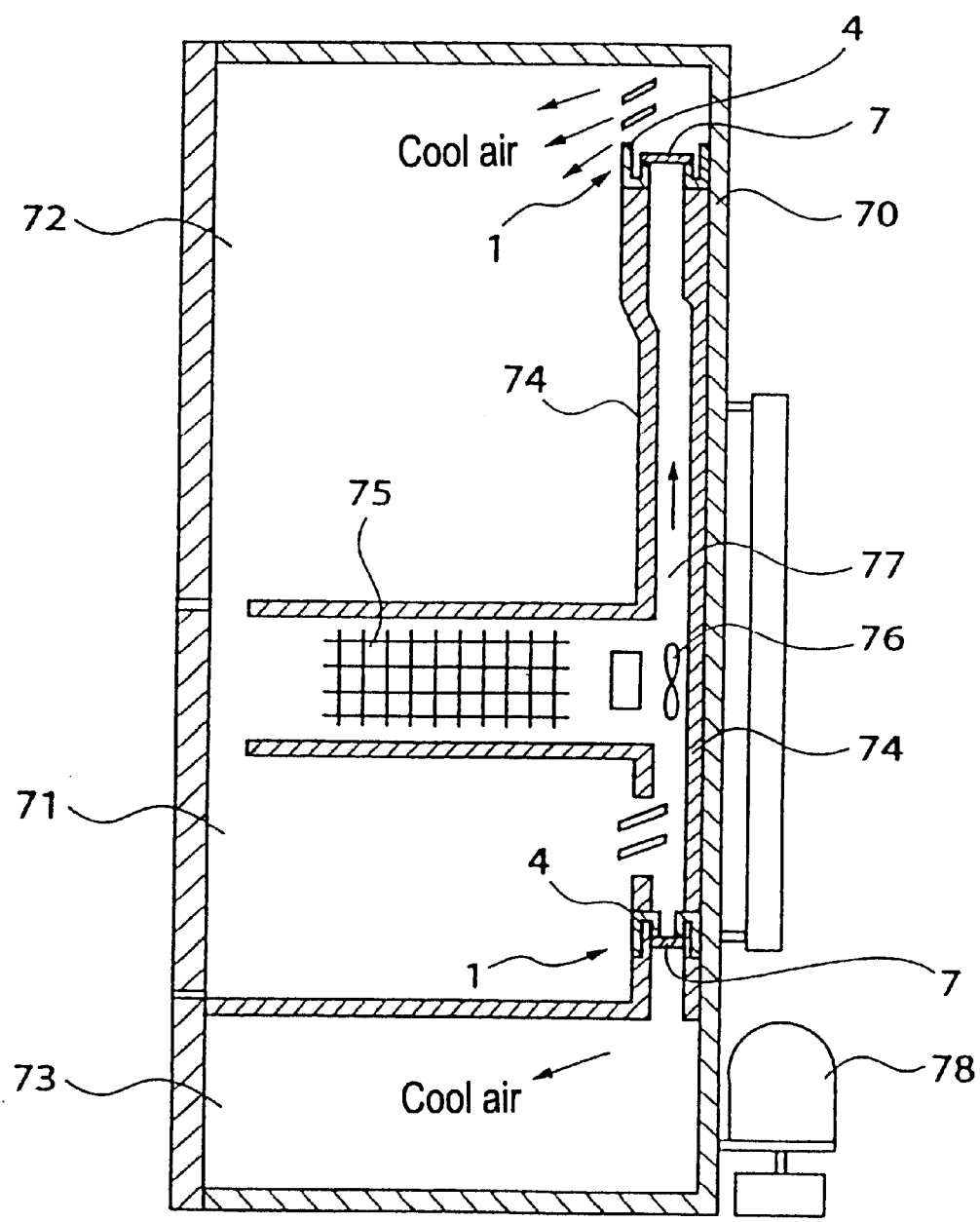
FIG. 8 is a sectional view to shown example of a refrigerator incorporating the motor-type damper unit in FIG. 1.

Next, incorporating of the described motor-type damper unit 1 of the invention into a refrigerator in the form, for example, as shown in FIG. 8 will be discussed.

A refrigerator 70 shown in FIG. 8 is a refrigerator put into a mid freezer, namely, a refrigerator of the type wherein cold air provided in the portion of an evaporator at the center is passed to a cold room at a top position at a distance from the evaporator; the refrigerator 70 comprises a freezer 71 at the center, a cold room 72 at the top, and a vegetable room 73 at the bottom. A duct 74 for sending cold air to the cold room 72 is formed and the motor-type damper unit 1 is inserted into the portion of the duct 74 leading to the cold room 72. That is, the frame 4 of the motor-type damper unit 1 is inserted so as to form a part of the duct 74 and the motor-type damper unit 1 itself also serves as a part of the duct 74.

The motor-type damper unit 1 may be installed in the vegetable room 73 rather than the cold room 72 or may be installed in both the rooms 72 and 73 as shown in FIG. 8. In the refrigerator 70, cold air produced in an evaporator 75 is sent by a fan motor 76 to the cold room 72 and the vegetable room 73 via a cold air circulation passage 77. The motor-type damper units 1 and 1 control introduction of the cold air into the cold room 72 and the vegetable room 73. A compressor 78 for liquefying a cooling medium and sending the liquefied medium to the evaporator 75 is placed in a lower part of the rear of the refrigerator 70.

Figure 9:
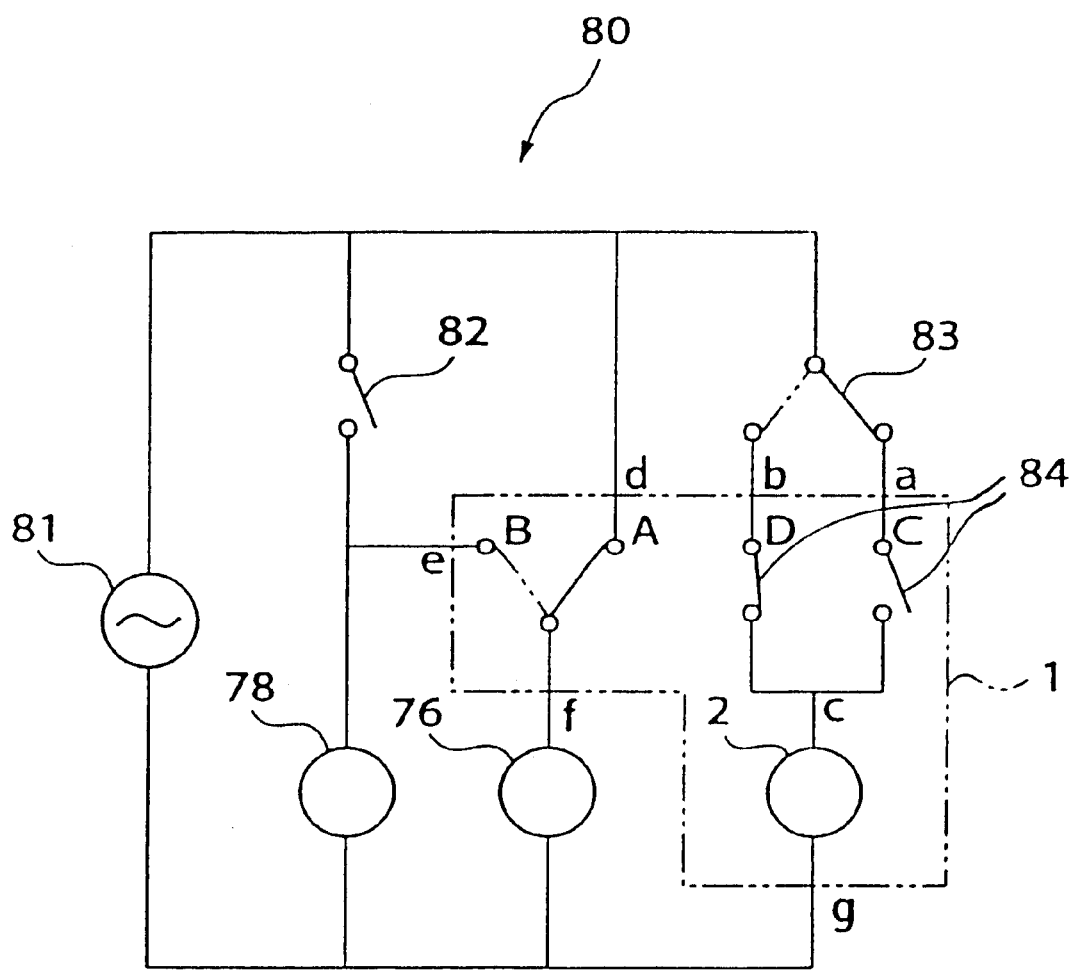
FIG. 9 is a diagram to show a control circuit of the refrigerator incorporating the motor-type damper unit in FIG. 1.

A control circuit 80 of the refrigerator 70 is as shown in FIG. 9. The compressor 78 is connected to an AC power supply 81 by a first temperature sensor 82. The first temperature sensor 82 is a thermostat switch, which is turned on for driving the compressor 78 when the room in which the evaporator 75 is placed reaches a predetermined temperature or more.

The fan motor 75 is installed in parallel with the compressor 78 and the fourth contact piece 64 (contact piece f) operating with the fan motor cam 56 is switched alternately to an A switch on the fifth contact piece 65 (contact piece d) side and a B switch on the sixth contact piece 66 (contact piece e) side.

A motor drive circuit of the small AC synchronous motor 2 is placed in parallel with both the compressor 78 and the fan motor 76. The motor drive circuit consists of three parts connected in series to the AC power supply 81, namely, a second temperature sensor 83, a changeover switch part 84 made up of the first contact piece 61, the second contact piece 62, and the third contact piece 63 operating with the damper cam 55, and the small AC synchronous motor 2.

The second temperature sensor 83 is a thermostat switch. When the cold room 72 reaches a predetermined temperature, for example, 2° C. or less, the second temperature sensor 83 is switched from the contact piece a to the contact piece b; when the cold room 72 reaches a predetermined temperature, for example, 5° C. or more, the second temperature sensor 83 is switched from the contact piece b to the contact piece a. The changeover switch part 84 is made up of a C switch formed of the first contact piece 61 (contact piece a) and the second contact piece 62 (contact piece c) and a D switch formed of the third contact piece 63 (contact piece b) and the second contact piece 62 (contact piece c).

A sheet 90 made of expanded polyethylene is provided on the opening portion 5 side of the baffle 7 for strongly sealing the opening portion 5 when the baffle 7 is closed. It takes such as to prevent a cold air from being leaked. The sheet 90 contains a space 92 for placing a hook part 91 to which one end of the coil spring 89 is attached. An opposite end of the coil spring 89 is held on a spring retainer 93 in the opening portion 5.

Figure 10:
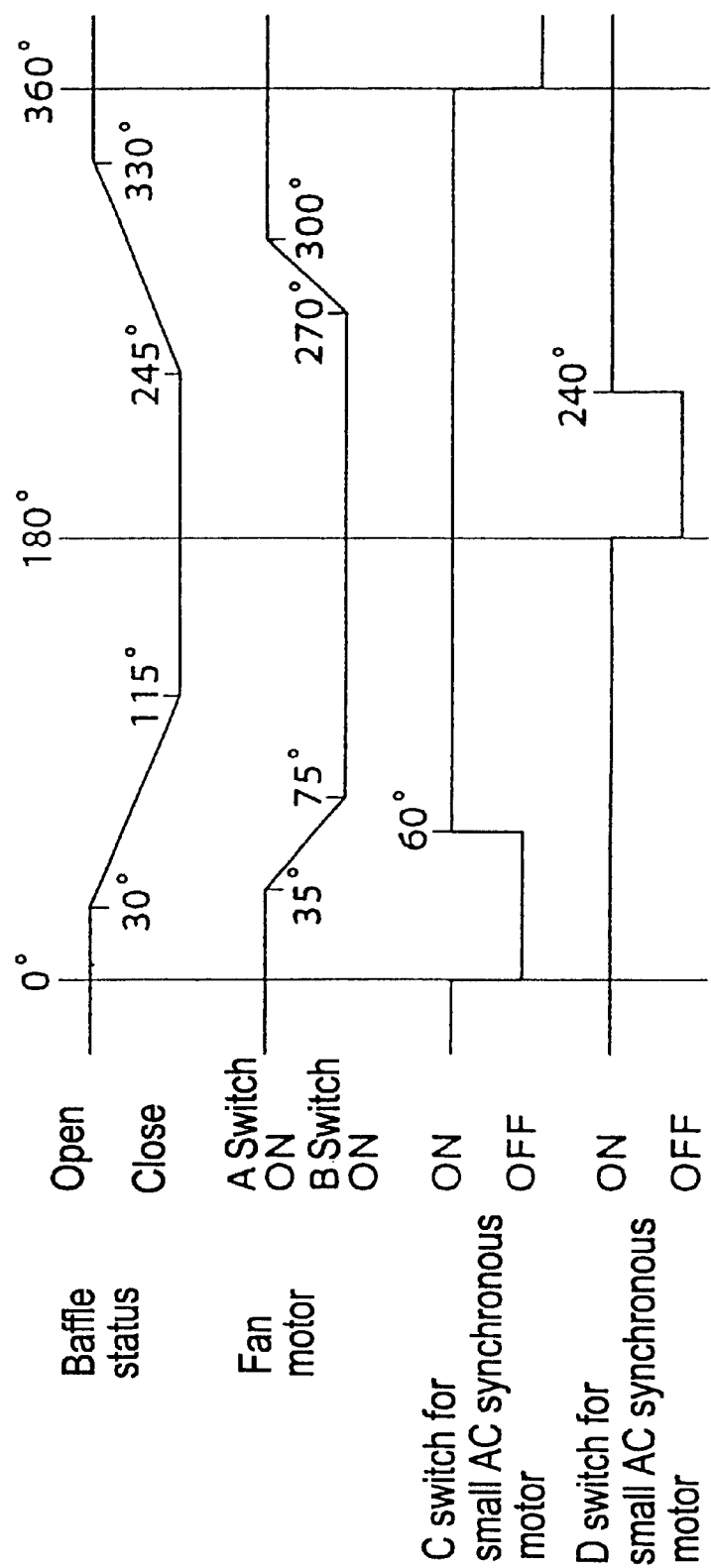
FIG. 10 is an operation chart of the motor-type damper unit in FIG. 1.

Next, the operation of the motor-type damper unit 1 will be discussed with reference to an operation chart of FIG. 10 and schematic representations of FIGS. 11 to 16 to describe the operation of the motor-type damper unit 1.

Figure 11A:
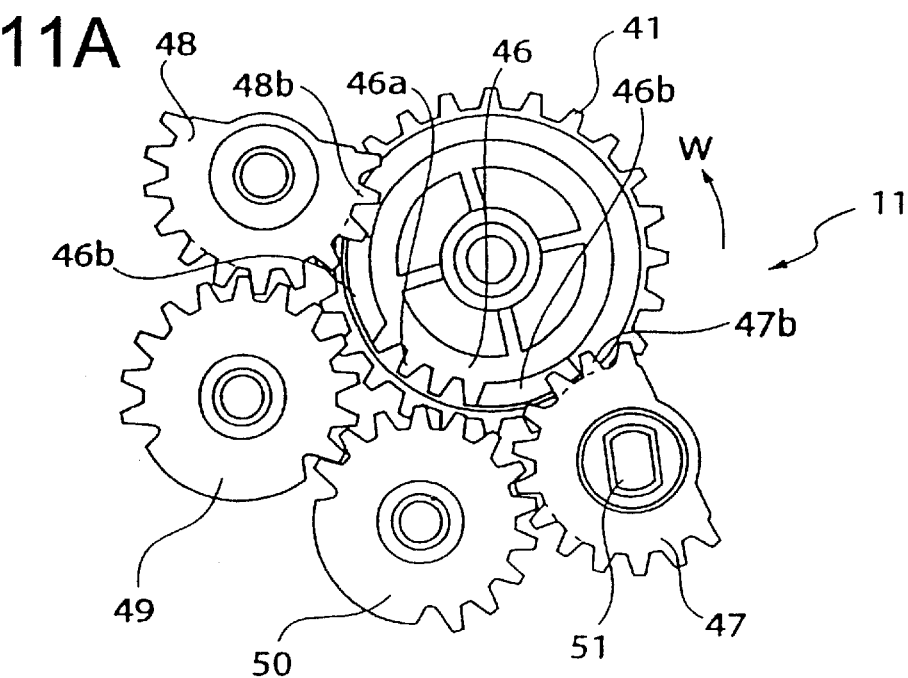
FIGS. 11A and 11B are drawings to describe the operation of the motor-type damper unit in FIG. 1; 11A is a drawing to show the state of the main part of a gear train part when a baffle is in a sufficient open stop position state and 11B is a drawing to show the state of a cam part corresponding to that state.
Figure 11B:
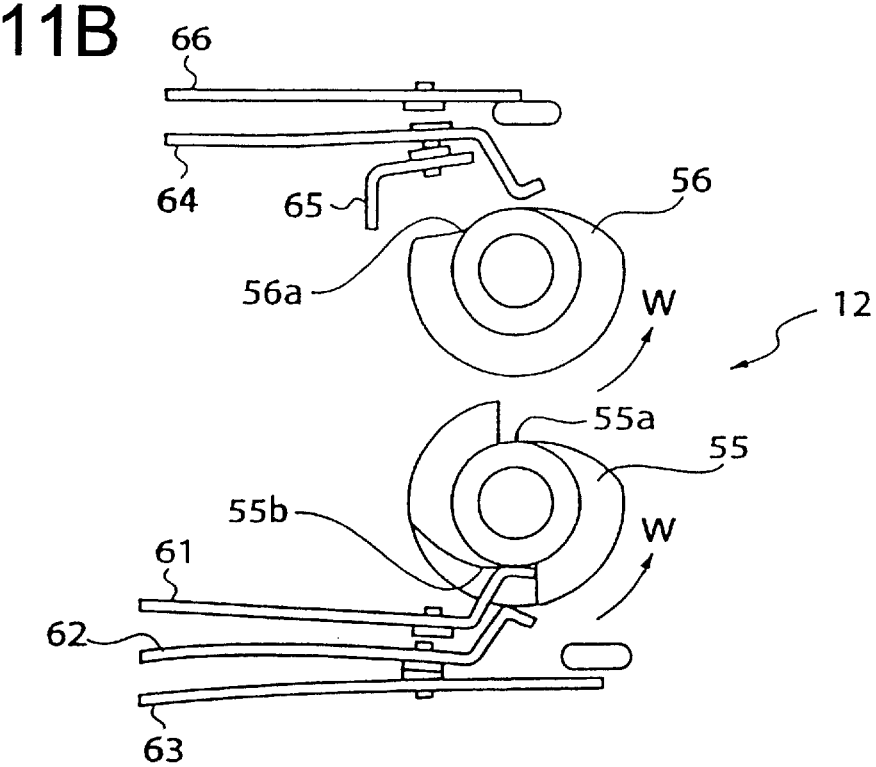

First, the initial state is assumed to be a full open stop position where the baffle 7 is opened, as shown like the solid line position in FIG. 1. FIGS. 11A and 11B show the positional relationship between the gear train part 11 and the cam part 12 in the state. The drive gear 41 is at the position of 0 degrees in the operation chart of FIG. 10. In the control circuit 80 at this time, the A switch is on (the fourth contact piece 64 and the fifth contact piece 65 are on), so that the fan motor 76 continues to drive independently of the state of the first temperature sensor 82. Thus, cold air continues to be introduced into the cold room 72.

On the other hand, the C switch of the changeover switch part 84 is off (the first contact piece 61 and the second contact piece 62 are off) and the D switch is on (the third contact piece 63 and the second contact piece 62 are on). Further, the second temperature sensor 83 is connected to the contact piece a side. When the baffle 7 is sufficient open, as shown in FIG. 11, to hold the position, the rotation blocking parts 46*b* and 46*b* of the intermittent drive gear 46 overlap the second tooth parts 47*b* and 48*b* of the first transmission gear 47 and the second transmission gear 48 and they abut on the plane opposed in the axial direction thereof, blocking rotation of the first transmission gear 47 and more particularly rotation in the closing direction.

In this state, if the temperature in the cold room 72 becomes a predetermined temperature or less, the second temperature sensor 85 is switched to the contact b side. Then, the small AC synchronous motor 2 is driven and rotation of the motor, namely, rotation in the same direction as the rotation direction before stop is transmitted to the gear part 45 of the drive gear 41 via the pinion 32, the first gear 42, the second gear 43, and the third gear 44. The drive gear 41 containing the gear part 45 is rotated in the arrow W direction in FIG. 11A.

When the drive gear 41 is rotated in the W direction, the tooth part 46*a* of the intermittent drive gear 46 provided integrally with the drive gear 41 coaxially starts to mesh with the first transmission gear 47. As the tooth part 46*a* meshes with the first transmission gear 47, the first transmission gear 47 starts to rotate in the arrow T1 direction in FIG. 12A. Thus, the baffle 7 starts to rotate in the closing direction.

When the rotation angle of the drive gear 41 exceeds 35 degrees, the A switch for the fan motor 76 starts to be turned off. That is, the fourth contact piece 64 starts to be brought out of contact with the fifth contact piece 65. After this, when the rotation angle of the drive gear 41 reaches 75 degrees, the B switch is turned on. That is, the fourth contact piece 64 and the sixth contact piece 66 come in contact with each other. On the other hand, when the rotation angle of the drive gear 41 reaches 60 degrees, the C switch for the small AC synchronous motor 2 is turned on and the D switch continues to be on. That is, the first contact piece 61, the second contact piece 62, and the third contact piece 63 are all placed in a contact state.

Figure 12A:
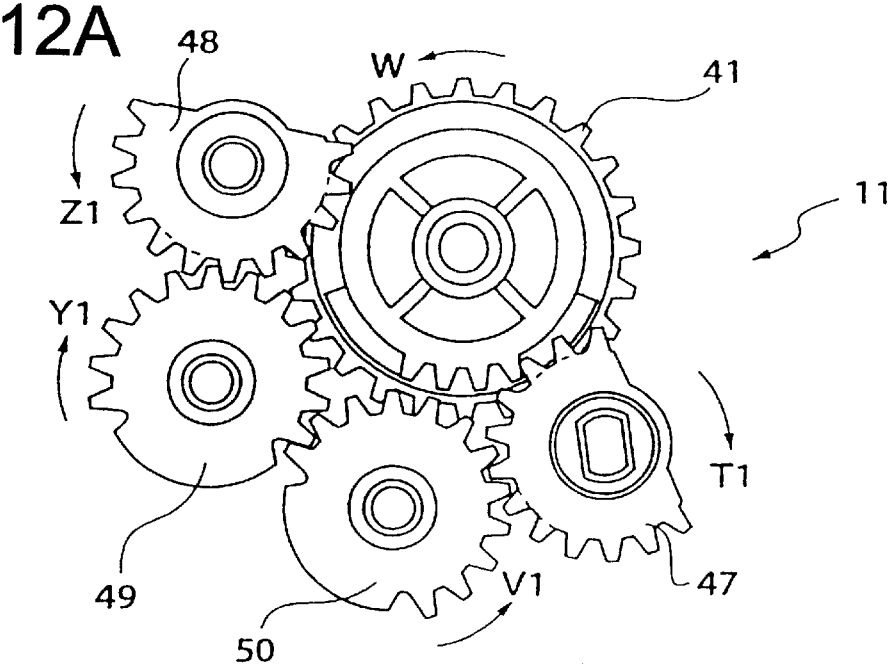
FIGS. 12A; and 12B are drawings to describe the operation of the motor-type damper unit in FIG. 1; 12A is a drawing to show the state of the main part of the gear train part when the baffle is in a closing operation start position state and 12B is a drawing to show the state of the cam part corresponding to that state.
Figure 12B:
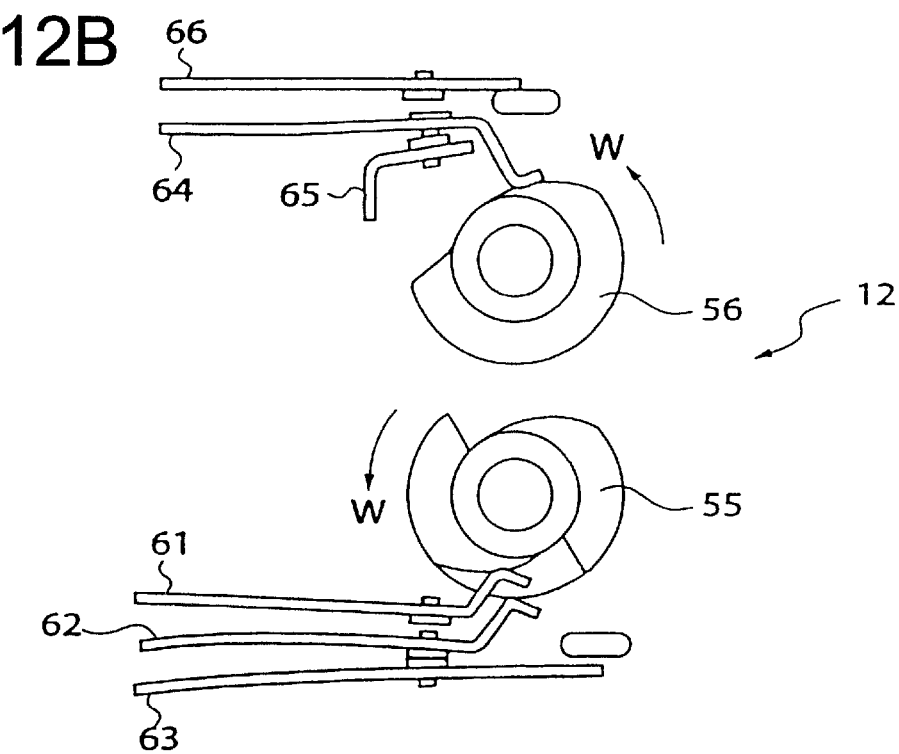

When the first transmission gear 47 rotates in the arrow T1 direction, the seventh gear 50 rotates in the arrow V1 direction in FIG. 12A, the sixth gear 49 rotates in the arrow Y1 direction, and the second transmission gear 48 rotates in the arrow Z1 direction. At this time, the second transmission gear 48 rotates freely because it does not mesh with any portion of the intermittent drive gear 46.

Figure 13A:
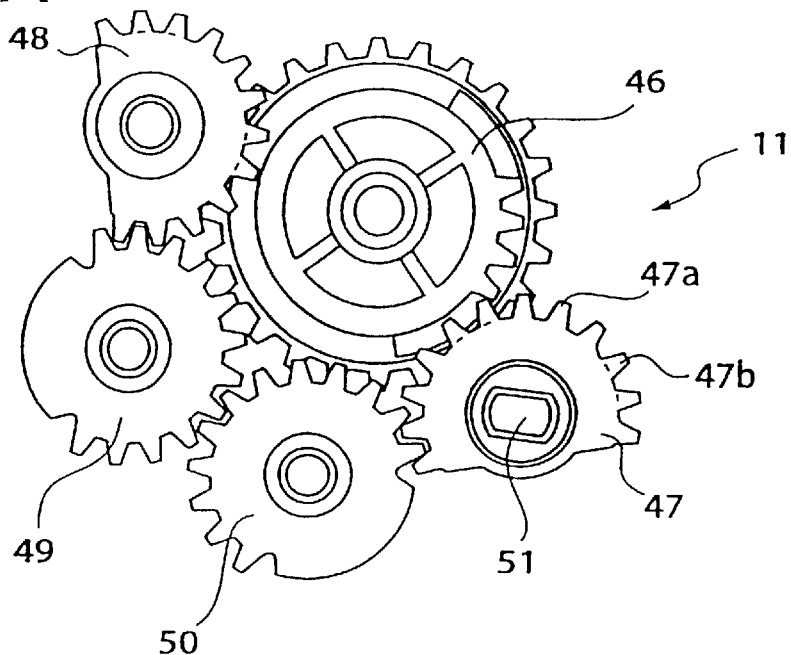
FIGS. 13A and 13B are drawings to describe the operation of the motor-type damper unit in FIG. 1; 13A is a drawing to show the state of the main part of the gear train part when the baffle is in a closing operation end position state and 13B is a drawing to show the state of the cam part corresponding to that state.
Figure 13B:
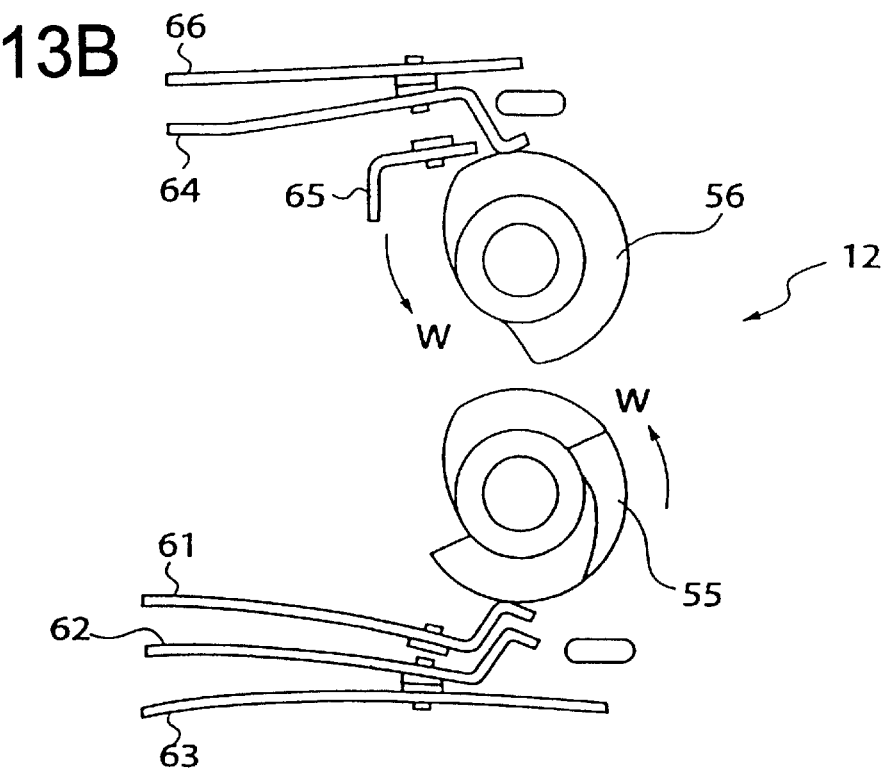

When rotation of the intermittent drive gear 46 continues and the drive gear 41 rotates 115 degrees, the first transmission gear 47 rotates 90 degrees from the sufficient closed state and the baffle 7 is sufficient closed. FIGS. 13A and 13B show the gear train part 11 and the cam part 12 in the state. The second tooth part 47*b* of the first transmission gear 47 overlaps the rotation blocking part 46*b* of the intermittent drive gear 46, namely, the planes opposed in the axial direction thereof abut, blocking rotation of the first transmission gear 47.

However, a slight gap exists in the engagement portion of the fulcrum shaft substrate 51 and the first transmission gear 47 and the fulcrum shaft substrate 51 can be rotated in the closing direction as much as the gap. The gap becomes almost zero as the baffle 7 is urged in the closing direction by the coil spring 8. Strong sealing of the baffle 7 is accomplished as the sheet 90 sinks into the frame 4 forming the opening portion 5 by the urging force of the coil spring 8. When the sheet 90 sinks into the frame 4, the above-mentioned gap becomes almost zero.

On the other hand, the fan motor cam 56 and the damper cam 55 of the cam part 12 continue to rotate in the arrow W direction and enter a state in FIG. 13B. The B switch (the fourth contact piece 64 and the sixth contact piece 66) turned on at the point of rotation angle 75 degrees remains on and the C switch (the first contact piece 61 and the second contact piece 62) turned on at the point of rotation angle 60 degrees also remains on.

Figure 14A:
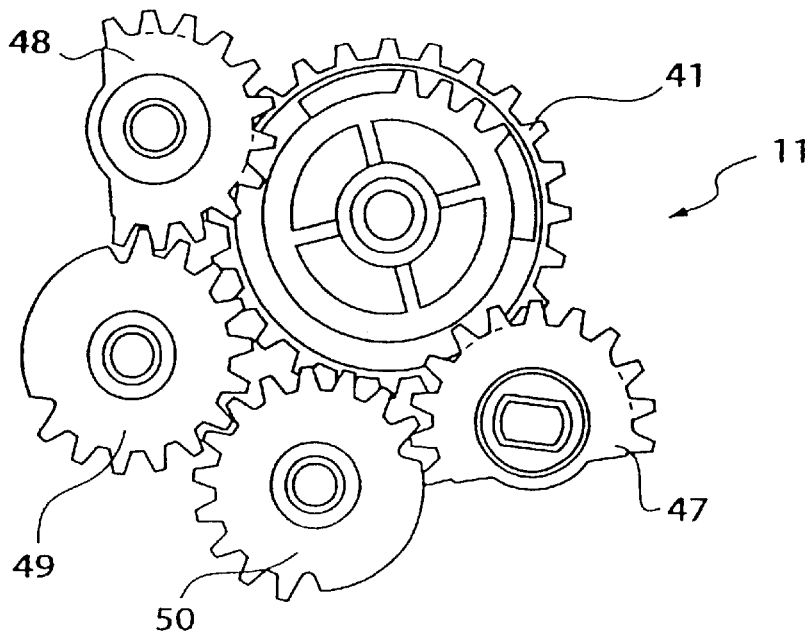
FIGS. 14A and 14B are drawings to describe the operation of the motor-type damper unit in FIG. 1; 14A is a drawing to show the state of the main part of the gear train part when the baffle is in a sufficient closed stop position state and 14B is a drawing to show the state of the cam part corresponding to that state.
Figure 14B:
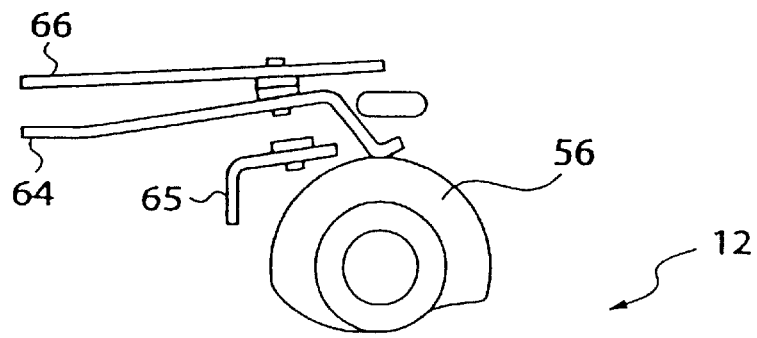
Figure 14B:
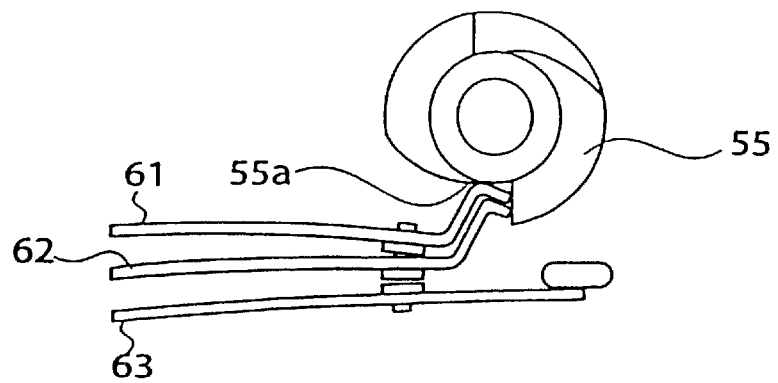

Then, the intermittent drive gear 46 and the drive gear 41 continue to rotate and when the rotation angle reaches 180 degrees, the intermittent drive gear 46 is brought away from the first transmission gear 47 and the second transmission gear 48, as shown in FIG. 14A. At this time, the baffle 7 is urged in the closing direction by the coil spring 8 and continues to cover the opening portion 5. On the other hand, the first contact piece 61 and the second contact piece 62 abutting the damper cam 55 of the cam part 12 rotate 180 degrees and at this point in time, drop into the step part 55*a* and come off the third contact piece 63. That is, the D switch of the control circuit 80 is turned off. Thus, the small AC synchronous motor 2 stops. The C switch remains on.

After this, the state in which the baffle 7 is closed continues. If the baffle 7 is closed, cold air is not introduced into the cold room 72, so that the temperature in the cold room 72 starts to rise. When it exceeds a predetermined temperature, for example, 5° C., the second temperature sensor 83 is switched from the contact piece b side to the contact piece a side, whereby power is again supplied to the small AC synchronous motor 2, which then starts to drive.

When the small AC synchronous motor 2 starts to rotate, the first gear train causes the drive gear 41 to start again to rotate in the arrow W direction. When the rotation angle reaches 245 degrees, the tooth part 46*a* of the intermittent drive gear 46 starts to mesh with the second transmission gear 48. When the rotation angle is 240 degrees, the D switch (the second contract piece 62 and the third contact piece 63) of the control circuit 80 is turned on, whereby both the C and D switches are turned on.

Figure 15A:
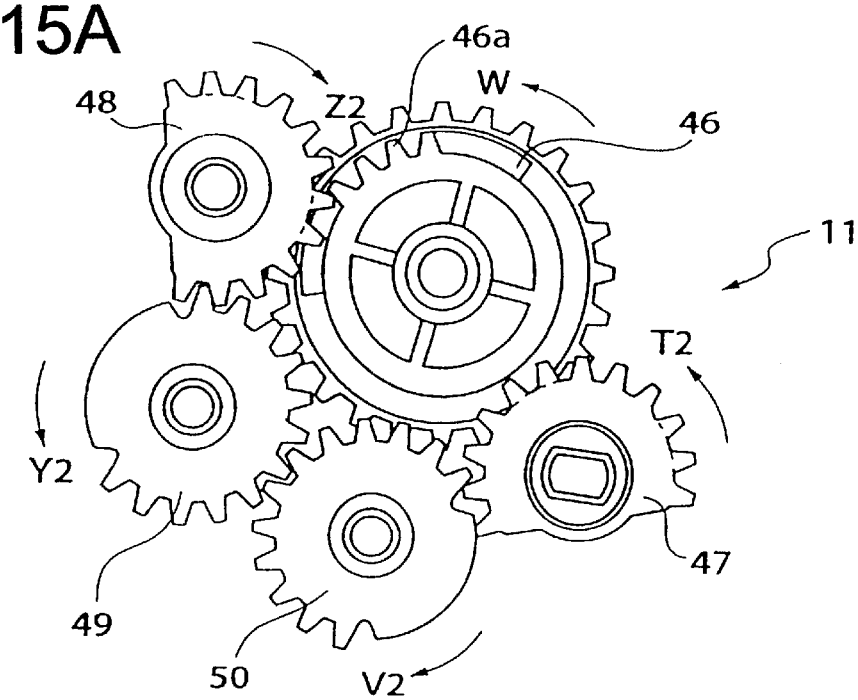
FIGS. 15A and 15B are drawings to describe the operation of the motor-type damper unit in FIG. 1; 15A is a drawing to show the state of the main part of the gear train part when the baffle is in an open operation start position state and 15B is a drawing to show the state of the cam part corresponding to that state.
Figure 15B:
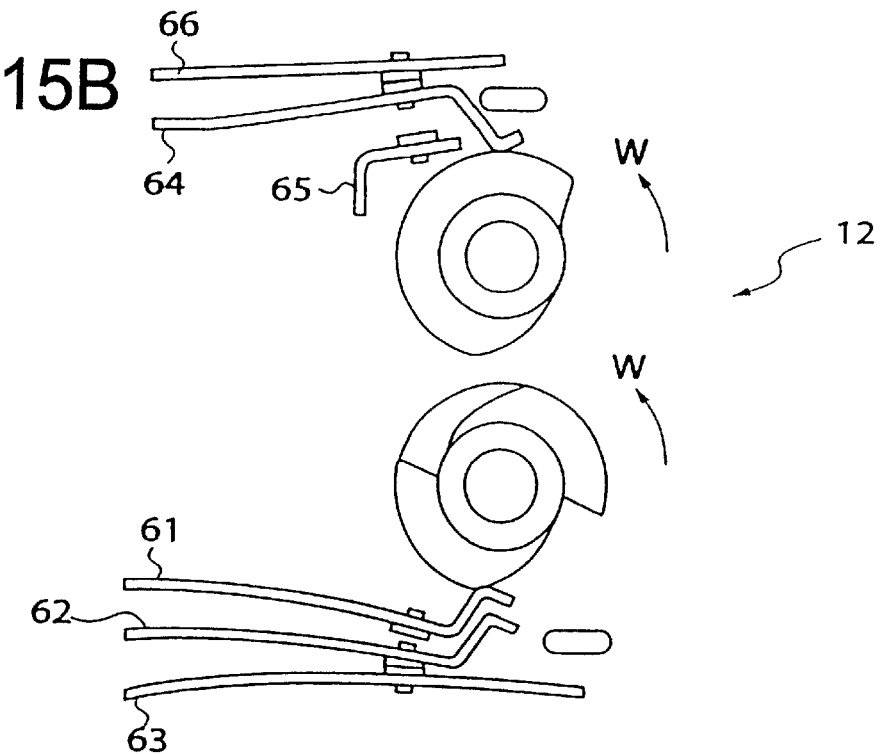
Figure 16A:
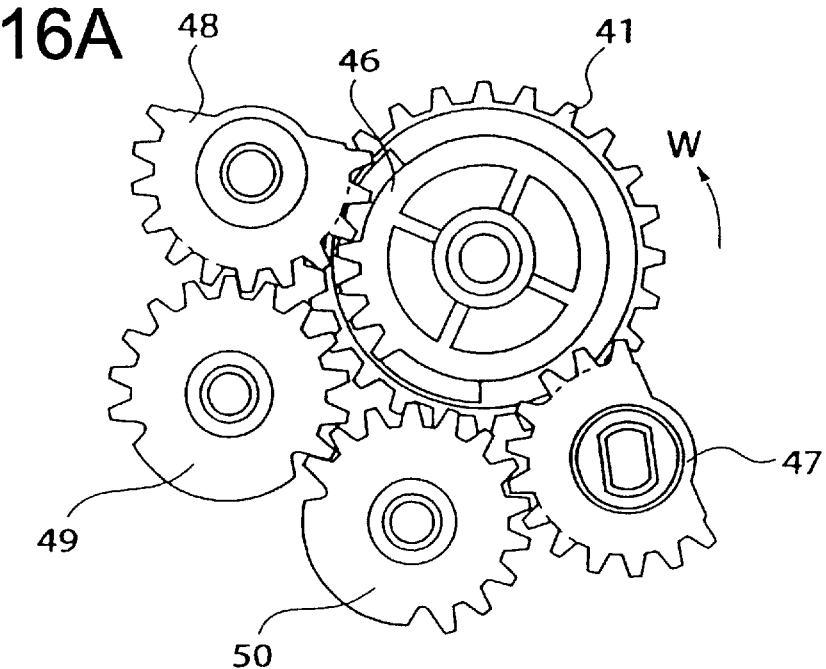
FIGS. 16A and 16B are drawings to describe the operation of the motor-type damper unit in FIG. 1; 16A is a drawing to show the state of the main part of the gear train part when the baffle is in an open operation end position state and 16B is a drawing to show the state of the cam part corresponding to that state.
Figure 16B:
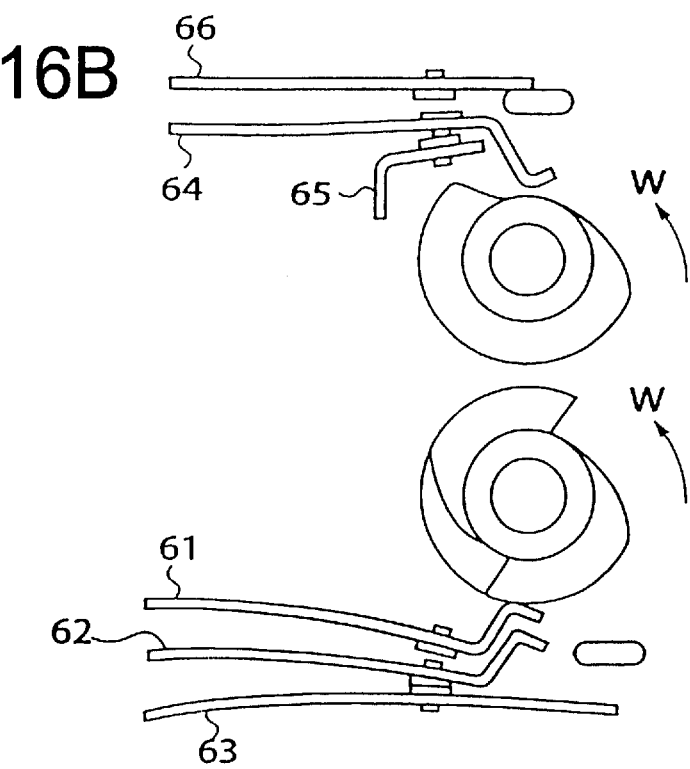
Figure 17:
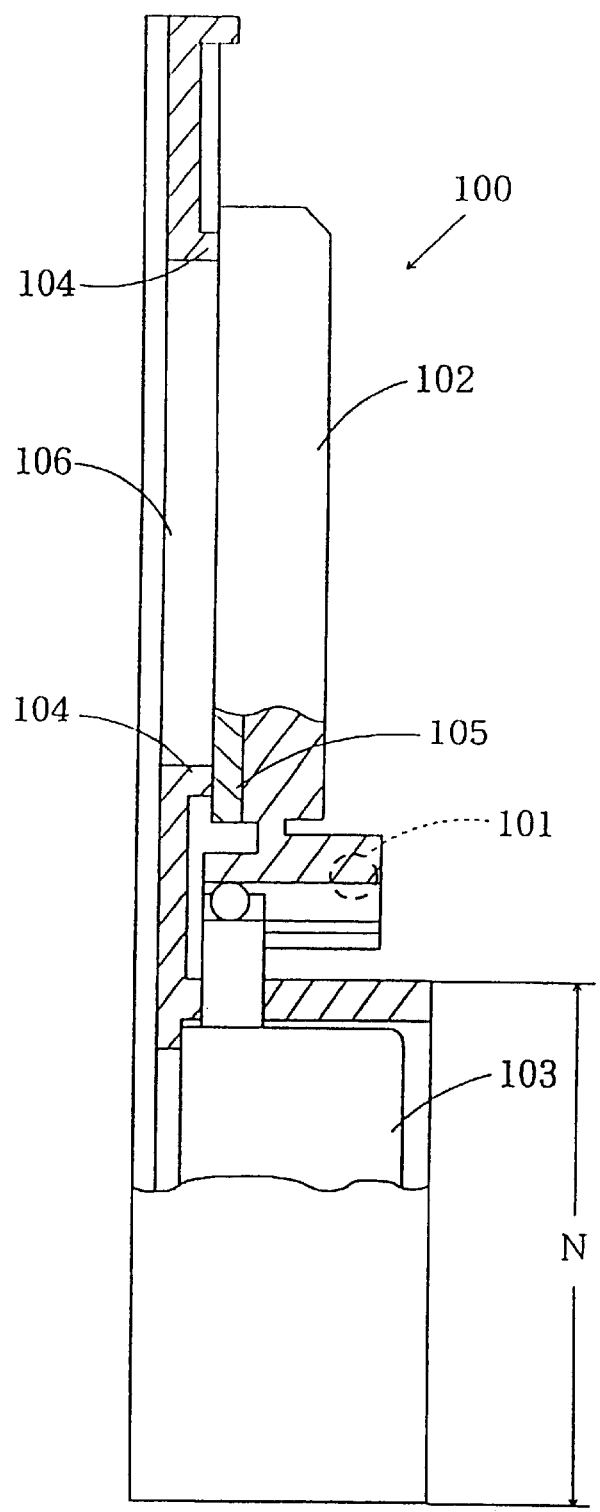
FIG. 17 is a fragmentary sectional side view of a motor-type damper unit in a related art.
Figure 18:
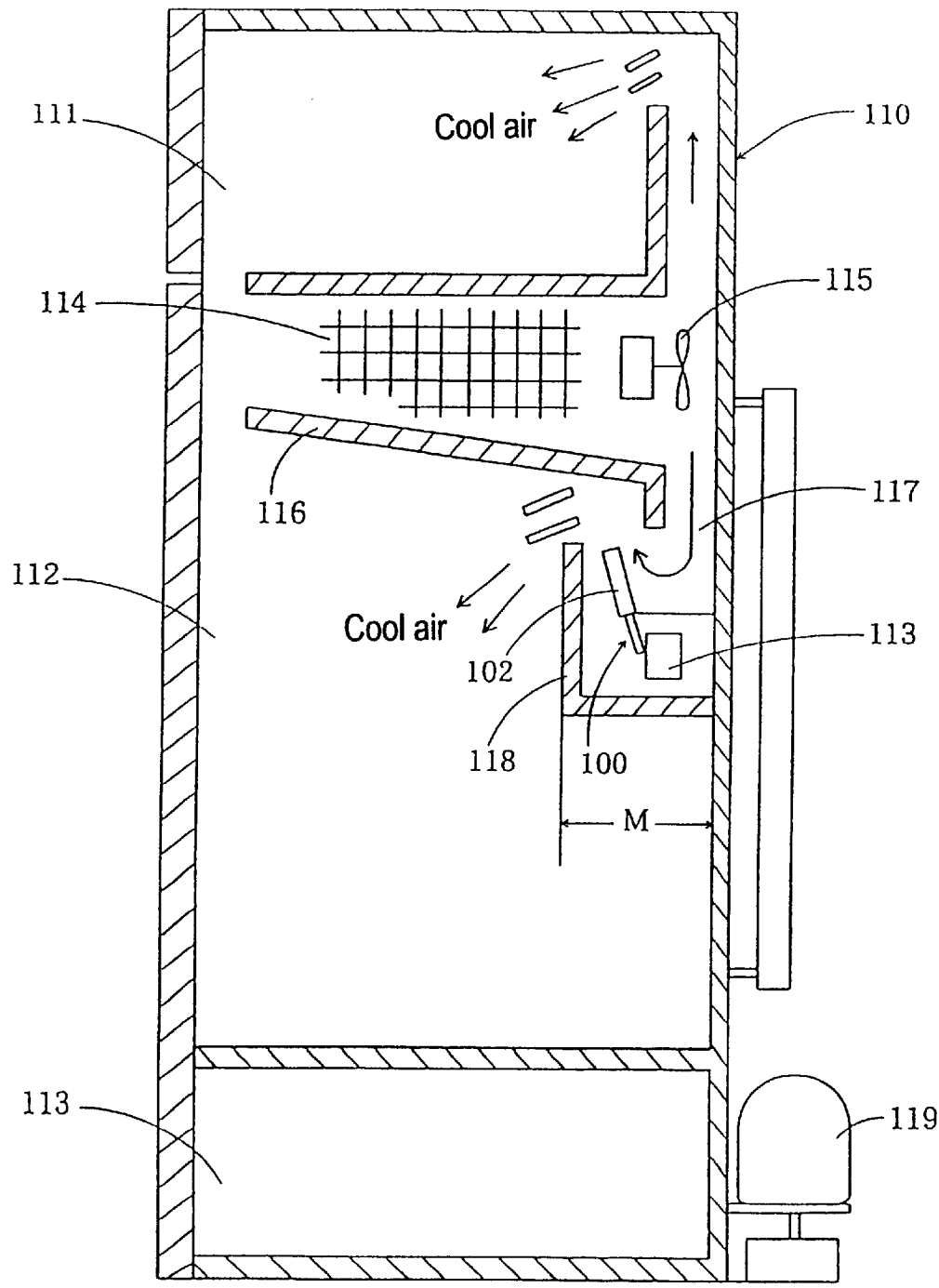
FIG. 18 is a drawing to describe a state in which the motor-type damper unit in the related art is incorporated into a refrigerator.

When the intermittent drive gear 46 meshes with the second transmission gear 48, the second transmission gear 48 starts to rotate in the arrow Z2 direction in FIG. 15A. Further, the sixth gear 49 starts to rotate in the arrow Y2 direction, the seventh gear 50 starts to rotate in the arrow V2 direction, and the first transmission gear 47 starts to rotate in the arrow T2 direction. As the first transmission gear 47 rotates in the arrow T2 direction, the baffle 7 starts to open against the urging force of the coil spring 8. When the rotation angle reaches 270 degrees, the B switch for the fan motor 76 starts to be turned off and when the rotation angle reaches 300 degrees, the A switch is turned on, whereby the fan motor 76 reliably starts to operate during the opening operation of the baffle 7, sending cold air to the cold room 72 reliably and rapidly.

When the rotation angle of the drive gear 41 reaches 330 degrees the baffle 7 becomes open. At this time, the baffle 7 is urged in the closing direction by the coil spring 8. However, rotation of the second transmission gear 48 is blocked by the intermittent drive gear 46, thus the first transmission gear 47 meshing with the second transmission gear 48 via the sixth gear 49 and the seventh gear 50 as the intermediate gear train does not rotate. The A switch of the control circuit 80 remains on and the C and D switches also remain on.

When the drive gear 41 makes a round (360 degrees), the C switch is turned off and rotation of the small AC synchronous motor 2 stops. The baffle 7 remains to be open, whereby cold air continues to be introduced into the cold room 72 and the temperature in the cold room 72 again starts to lower.

The operation is repeated for maintaining the cold room 72 in a predetermined temperature range. If the motor-type damper unit 1 is used in the vegetable room 73, a similar description is also applied.

As many apparently widely different embodiments of the invention may be made without departing from the spirit and scope thereof, it is to be understood that the invention is not limited to the specific preferred embodiment thereof. For example, the small AC synchronous motor 2 rotating in one direction is used as the motor, but any other motor rotating in one direction such as a DC motor or a motor capable of rotating in both directions such as a stepping motor may be adopted. To use a motor capable of rotating in both directions, the motor may be rotated only in one direction or may be rotated in both directions. To rotate the motor in both directions, the motor is rotated in an opposite direction each time it rotates 360 degrees, whereby the baffle 7 can be opened and closed.

In the above-described embodiment, the first transmission gear 47 and the second transmission gear 48 are away from each other and are concatenated by the sixth gear 49 and the seventh gear 50, but they may be made adjacent with each other without being away from each other.

Figure 19:
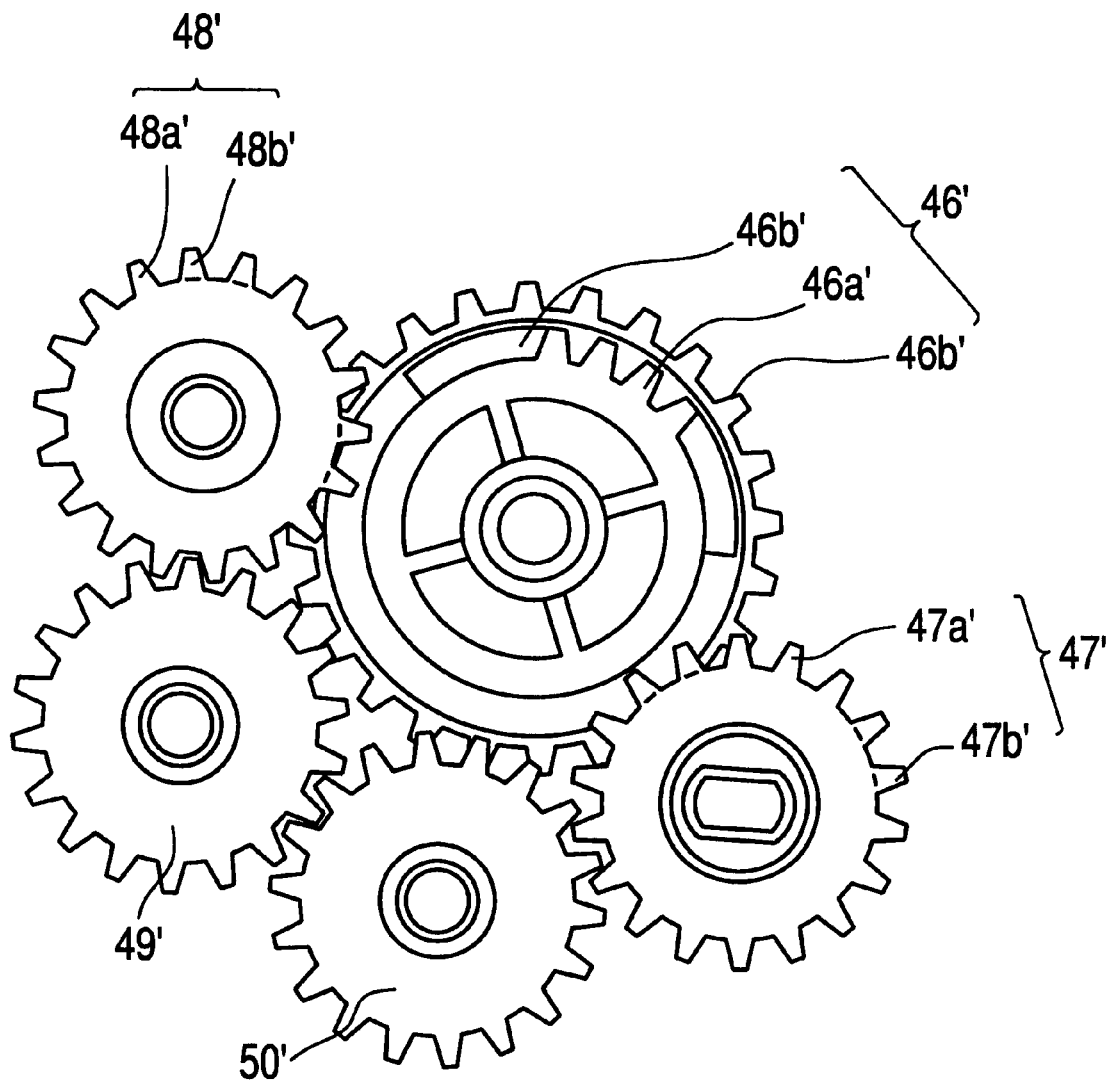
FIG. 19 is a drawing to describe a modified embodiment of the motor-type damper unit of the invention.

Further, as shown in FIG. 19, a first transmission gear 47', a second transmission gear 48', a sixth gear 49', and a seventh gear 50' are formed using normal gears, namely, gears formed with teeth over their full peripheries, so that the parts costs and the costs of the whole unit are reduced.

The modified embodiment in FIG. 19 is the same as the above-described embodiment except for the shapes of the gears and therefore will not be discussed again. As described above, to simplify the structure, the first transmission gear 47', the second transmission gear 48', the sixth gear 49', and the seventh gear 50' are the same in the diameter and the number of teeth in the modified embodiment shown in FIG. 19. The invention is not limited to it.

The coil spring 8 in the above-described embodiment may be omitted or in addition, a magnetic substance or a magnet may be added to the baffle 7 for exerting an adsorption force between the magnetic substance or the magnet and magnetic substance or magnet placed on the frame 4 side. Further, the opening portion 5 may be tilted with respect to the frame 4 without being made vertical to the frame 4. In addition, the open position of the baffle 7 may be a tilted position with respect to the frame 4 without being made almost parallel to the frame 4.

As the coil spring 8 in the above-described embodiment, without pressing against the opening portion 5 using a tensile force, a compression spring may be placed on the rear of the baffle 7 so that the expansion force of the compression spring is used to abut the baffle 7 against the opening portion 5. This becomes useful for coping with the freezing time.

That is, as the baffle 7 moves in the closing direction, the compression spring is expanded in the same direction in the beginning and the expansion force of the compression spring can be opposed to 100% of a freezing force. On the other hand, the tensile force as in the above-described embodiment becomes a force having an angle with the closing direction, thus not all the tensile force can be opposed to the freezing force. Thus, when the baffle 7 is frozen in an open state, the compression spring would be able to release the baffle 7 from the frozen state using 100% of the spring force.

In place of the coil spring 8, a torsion coil spring may be wound on the fulcrum shaft 6 for pressing the baffle 7 in the closing direction from the rear of the baffle 7. In doing so, change in the spring pressure during the open operation can be lessened and the drive mechanism is stabilized. The spring pressure can be easily changed by changing the number of windings. Moreover, the winding part rubs against the fulcrum shaft 6 and the portion pressing the baffle 7 rubs against the baffle 7, so that it becomes hard to freeze.

In the above-described embodiment, the sheet 90 is used. However, if the sealing degree is not strictly required, the sheet 90 may be omitted. Further, in the above-described embodiment, a reduction gear train is used as the first gear train, but is not necessarily required. It may be a speed increasing gear train depending on the situation.

In the above-described embodiment, the frame 4 becomes the duct-shaped motor-type damper unit 1, but the invention can also be applied to a damper unit of any other structure. It can be applied to various damper units for controlling any other fluid such as a ventilation duct rather than a refrigerator. Further, as the frame 4, the frame on the side where the motor-type damper unit 1 is attached, for example, the duct 74 for cold air ventilation in the refrigerator 70 shown in FIG. 8 may be used intact.

The invention can be applied to other motor-type opening/closing units than the damper unit, such as a motor-type opening/closing unit for driving a looper of an air conditioner.

As described throughout the specification, the motor-type damper unit of the invention can rotate the first transmission gear in two directions by using the intermittent drive gear, the first transmission gear, and the second transmission gear. Thus, if a one-way rotation motor such as a small AC synchronous motor is used, an opened/closed member can be rotated in both directions by gear transmission. As a result, it is made possible to widen the rotation angle of the opened/closed member. It is also made possible to easily adopt a one-way rotation motor.

Adoption of a one-way rotation motor still facilitates motor control and becomes furthermore advantageous for the price and life. If the first transmission gear and the second transmission gear are brought away from each other, the structure of the opening/closing operation of the opened/closed member can be easily enhanced and it is made possible to smooth the operation.

What is claimed is:

1. A motor-type damper unit comprising:
   a motor for driving in a single direction;
   an opened/closed member for reciprocating in an opening direction and a closing direction with a fulcrum shaft serving as a center by a drive force of said motor;
   an intermittent drive gear formed with a tooth part in a predetermined part in a circumferential direction and rotation blocking parts at both ends of the tooth part, said intermittent drive gear for rotating by the drive force of said motor;
   a first transmission gear placed on the fulcrum shaft for engaging the tooth part of said intermittent drive gear, thereby rotating said opened/closed member in a predetermined direction; and
   a second transmission gear for engaging the tooth part of said intermittent drive gear at a different position from said first transmission gear, for transmitting a rotation force of said intermittent drive gear to said first transmission gear and for rotating said first transmission gear in an opposite direction to the predetermined direction.

2. The motor-type damper unit as claimed in claim 1 wherein said motor is a one-way drive motor.

3. The motor-type damper unit as claimed in claim 1 wherein an intermediate gear train includes gears is placed between said first transmission gear and said second transmission gear, and said intermediate gear train includes gears, and the number of said gears is a multiple of two.

4. The motor-type damper unit as claimed in claim 1 further comprising:
   a gear train placed between said motor and said intermittent drive gear for transmitting the drive force of said motor.

* * * * *